(12) United States Patent
Johnsson et al.

(10) Patent No.: US 8,667,479 B2
(45) Date of Patent: Mar. 4, 2014

(54) MOBILE SPECIALIZED SOFTWARE CODE UPDATED

(75) Inventors: Andreas Johnsson, Uppsala (SE); Ayodele Damola, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 248 days.

(21) Appl. No.: 13/144,976

(22) PCT Filed: Jan. 19, 2009

(86) PCT No.: PCT/IB2009/000079
§ 371 (c)(1),
(2), (4) Date: Jul. 18, 2011

(87) PCT Pub. No.: WO2010/082077
PCT Pub. Date: Jul. 22, 2010

(65) Prior Publication Data
US 2011/0276957 A1 Nov. 10, 2011

(51) Int. Cl.
*G06F 9/44* (2006.01)

(52) U.S. Cl.
USPC ........... 717/170; 717/120; 717/121; 717/122; 717/168; 717/169; 717/171; 717/172; 717/173; 717/174; 717/175; 717/176; 717/177; 717/178

(58) Field of Classification Search
None
See application file for complete search history.

(56) References Cited

U.S. PATENT DOCUMENTS 6,738,349 B1 * 5/2004 Cen ................................ 370/231

(Continued)

FOREIGN PATENT DOCUMENTS

CN 1564979 A 1/2005

(Continued)

OTHER PUBLICATIONS

Simpson Jr, Charles Robert, and George F. Riley. "NETI@ home: A distributed approach to collecting end-to-end network performance measurements." Passive and Active Network Measurement. Springer Berlin Heidelberg, 2004. 168-174.*

(Continued)

*Primary Examiner* — Don Wong
*Assistant Examiner* — Adam Conkey
(74) *Attorney, Agent, or Firm* — Potomac Patent Group PLLC

(57) ABSTRACT

A first host (60), computer readable medium and method for providing a specialized software package (24) to a second host (70). The method includes initializing, at the first host (60), an application (90) on the first host (60) for communicating with a corresponding application (100) on the second host (70); sending, from the first host (60), a message for verifying a presence of the specialized software package (24) on the second host (70); pushing, when the specialized software package (24) is not present on the second host (70), the specialized software package (24) from the first host (60) to the second host (70); performing, at the first host (60), a specialized activity based on the specialized software package (24) at the first host (60) and the specialized software package (24) at the second host (70); and receiving at the application (90) of the first host (60), a result of the specialized activity, wherein the result of the specialized activity is used by the application (90) at the first host (60) to communicate with the corresponding application (100) on the second host (70).

16 Claims, 10 Drawing Sheets

(56) References Cited

U.S. PATENT DOCUMENTS

| | | | |
|---|---|---|---|
| 7,856,574 B2* | 12/2010 | Johnson et al. ............... | 714/25 |
| 8,010,100 B2* | 8/2011 | Kushwaha et al. ........... | 455/423 |
| 8,103,718 B2* | 1/2012 | O'Shea et al. ................ | 709/203 |
| 8,295,186 B2* | 10/2012 | Damm ......................... | 370/248 |
| 8,438,269 B1* | 5/2013 | West, III ...................... | 709/224 |
| 2003/0046681 A1* | 3/2003 | Barturen et al. ............. | 717/177 |
| 2004/0015961 A1 | 1/2004 | Chefalas et al. | |
| 2004/0068721 A1 | 4/2004 | O'Neill et al. | |
| 2005/0132359 A1 | 6/2005 | McGuire et al. | |
| 2005/0265240 A1* | 12/2005 | Jain et al. ...................... | 370/241 |
| 2006/0153091 A1* | 7/2006 | Lin et al. ....................... | 370/252 |
| 2006/0187900 A1* | 8/2006 | Akbar ........................... | 370/352 |
| 2006/0280150 A1 | 12/2006 | Jha et al. | |
| 2009/0131043 A1* | 5/2009 | Uchida et al. ................ | 455/423 |
| 2009/0138697 A1* | 5/2009 | Kim et al. ..................... | 713/150 |
| 2009/0157797 A1* | 6/2009 | Chang et al. .................. | 709/202 |
| 2011/0023105 A1* | 1/2011 | Islam et al. .................... | 726/11 |

FOREIGN PATENT DOCUMENTS

| | | |
|---|---|---|
| CN | 1848085 A | 10/2006 |
| EP | 1043656 A2 | 10/2000 |
| WO | 03/025742 A2 | 3/2003 |
| WO | 2007/061370 A1 | 5/2007 |
| WO | WO2009127222 * | 10/2009 |

OTHER PUBLICATIONS

International Search Report mailed Jul. 14, 2009 in corresponding International Application No. PCT/IB2009/000079.

Written Opinion mailed Jul. 14, 2009 in corresponding International Application No. PCT/IB2009/000079.

S. Ekelin, et al., "Real-time measurement of end-to-end available bandwidth using Kalman filtering," IEEE/IFIP Network Operations and Management Symposium, NOMS 2006, Vancouver, Canada, Apr. 2006, pp. 1-17.

V. Ribeiro, et al., "pathChirp: Efficient available bandwidth estimation for network paths," Proceedings of the Passive and Active Measurement Workshop, 2003, San Diego, CA, pp. 1-11.

M. Jain, et al., "Pathload: a measurement too for end-to-end available bandwidth," Proceedings of the Passive and Active Measurement Workshop, 2002, Ft. Collins, pp. 1-12.

J. Strauss, et al., "A measurement study of available bandwidth estimation tools," Proceedings of the ACM SIGCOMM Internet Measurement Workshop, Oct. 27-29, 2003, Miami, FL, pp. 1-6.

List of Java virtual machines, http://en.wikipedia.org/wiki/List_of_Java_Virtual_Machines, downloaded Jul. 21, 2011, pp. 1-5.

Mobile Agent, http://en.wikipedia.org/wiki/Mobile_agent, downloaded Jul. 21, 2011, pp. 1-4.

D. Kotz, Beyond mobile agents: mobile code in Pervasive Computing, Dartmouth College, Oct. 2002, http://agent.cs.dartmouth.edu/MA2002Keynote.ppt, downloaded Jul. 21, 2011, pp. 1-51.

Chinese Office Action in corresponding Chinese Application No. CN200980155418.7 mailed May 17, 2013.

* cited by examiner

MOBILE SPECIALIZED SOFTWARE CODE UPDATED

TECHNICAL FIELD

The present invention generally relates to hosts, software and methods and, more particularly, to mechanisms and techniques for providing specialized software package from a first host to a second host.

BACKGROUND

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the decades to come. All these new protocols are designed to support video communication between various hosts.

However, the hosts themselves need to be configured for supporting, for example, applications that need parameters measurable by a measurement tool, e.g., video communication, VoIP, gaming, interactive applications, etc. One aspect of these applications is the capability of the hosts to perform active end-to-end measurements to provide the needed parameters. The active end-to-end measurements are, for example, round-trip time (RTT), jitter, availability or available bandwidth between hosts in packet-switched networks. These measurements, i.e., the measured parameters, may be used by a wide range of network applications. In one application, such information may be used for optimizing file transfer performance between hosts or it can simply be used for monitoring a network path.

Conventionally, end-to-end network measurement methods require that both end-points (hosts) participate in the measurement. For example, end-to-end available bandwidth measurement methods such as BART (Ekelin et al., "Real-time measurement of end-to-end available bandwidth using Kalman filtering," in Proceedings to the 10th IEEE/IFIP Network Operations and Management Symposium, Vancouver, Canada, April 2006, and S. Ekelin and M. Nilsson, "Using Filtering and Active Probing to Evaluate a Data Transfer Path," U.S. patent application Ser. No. 11/285,723, the entire contents of which are incorporated here by reference), path-Chirp (Ribeiro et al., "pathChirp: Efficient available bandwidth estimation for network paths," in Proceedings of the Passive and Active Measurement Workshop, San Diego, 2003, the entire content of which is incorporated by reference), Pathload (M. Jain and C. Dovrolis, "Pathload: a measurement tool for end-to-end available bandwidth," in Proceedings of the Passive and Active Measurement Workshop, Ft Collins, 2002, the entire content of which is incorporated by reference) and Spruce (Strauss et al., "A measurement study of available bandwidth estimation tools," in Proceedings of the ACM SIGCOMM Internet Measurement Workshop, Miami, 2003, the entire content of which is incorporated by reference) require access to a sender node and a receiver node.

These methods rely on injecting UDP/IP (User Data Protocol) packets into the network path and measuring the relative change in inter-packet separation at the sender and receiver nodes. From this measurement, the available bandwidth between the nodes may be estimated by using various statistical analysis algorithms. Other common tools, such as ping, also require a sender node and a receiver node that have the appropriate software installed even though such methods already are implemented in the network stack.

Thus, when an application running on a first node needs one or more parameters related to the first node and the second node, both the first node and the second node need to have measurement software that enables the measurement of the parameters. If only the first node has the measurement software and the second node lacks that software, either the application would not be able to run on or the second node would request the user to download the measurement software. However, these approaches might be frustrating for the users. This scenario is illustrated in FIG. 1, in which a system 10 includes a node A 20, a node B 30 and a server 40. Node A 20 includes at least an application 22 and a measurement software MS 24. Node B 30 includes a corresponding application 32 but no corresponding measurement software.

Consider that applications 22 and 32 are related to video communication. When the user of Node A 20 launches application 22, this application performs some preparation work for establishing the video communication with Node B 30. Part of the preparation work is to establish the available bandwidth between Node A 20 and Node B 30. For determining the available bandwidth, the measurement software MS 24 needs to communicate with the counterpart measurement software at Node B 32. However, as discussed above, there are circumstances when Node B 32 either does not have the corresponding measurement software or does not have the same version of the MS. One solution for the application 22 is to inform the user of Node A 20 that a video communication may not be established with Node B. Another solution is for MS 24 to guess what the available bandwidth is and to use that value. However, this solution will result in a non-performant video communication between the nodes as, for example, when setting up an interactive video conference over the Internet the available bandwidth needs to be high enough while at the same time the latency should be as low as possible. Bad guesses of the path characteristics can be detrimental to the experienced video and audio quality.

Another solution, which is illustrated in FIG. 1, is to download at node B 30 the necessary measurement software MS 42 from server 40. Thus, the application 32 may request in step 34 the necessary software MS 42 from server 40 and may receive in step 36 the MS 42. Having the measurement software MS 42, applications 22 and 32 may complete the desired video communication.

However, this scenario requires the intervention of the user of Node B for downloading the MS software 42 from server 40 and supplemental communication exchanges between Node B and server 40. In addition, as the more advanced measurement techniques, such as those for measuring end-to-end available bandwidth, are developed over time and thus are being updated on a regular basis, both nodes would need the same software version to be able to utilize the measurement methods and thus, both nodes would eventually need to interact with server 40.

Accordingly, it would be desirable to provide devices, systems and methods that avoid the afore-described problems and drawbacks and are capable of performing the measurements even if one of the nodes does not have the measurement software.

SUMMARY

When an application on a first host tries to communicate with a corresponding application on a second host, different from the first host, the application may require that certain measurements are performed for establishing an accurate communication with the corresponding application. Such measurement may be performed by a specialized software package. However, the second host may lack the specialized software package.

According to one exemplary embodiment, there is a method for providing the specialized software package from the first host to the second host. The method includes initializing, at the first host, the application on the first host for communicating with the corresponding application on the second host. The first host may send a message for verifying a presence of the specialized software package on the second host. When the specialized software package is not present on the second host, the specialized software package from the first host is pushed to the second host. Having the specialized software package at both hosts, the first host performs a specialized activity based on the specialized software package at the first host and the specialized software package at the second host. A result of the specialized activity is received at the application of the first host, which is used by the application at the first host to communicate with the corresponding application on the second host.

According to another exemplary embodiment, there is a computer readable medium including computer executable instructions, wherein the instructions, when executed, implement a method for providing a specialized software package from the first host to the second host. The method includes the steps discussed in the above paragraph.

According to still another exemplary embodiment, a communication device may be configured for providing the specialized software package to another communication device. The communication device includes a memory for storing an application that is configured to communicate with a corresponding application on the another communication device and a processor. The processor is configured to send a message for verifying a presence of the specialized software package on the another communication device, push, when the specialized software package is not present on the another communication device, the specialized software package from the communication device to the another communication device, perform a specialized activity based on the specialized software package at the communication device and the specialized software package at the another communication device, and receive a result of the specialized activity. The result of the specialized activity is used by the application at the communication device to communicate with the corresponding application at the another communication device.

It is an object to overcome some of the deficiencies discussed in the previous section and to provide a host capable of pushing desired software to another host.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
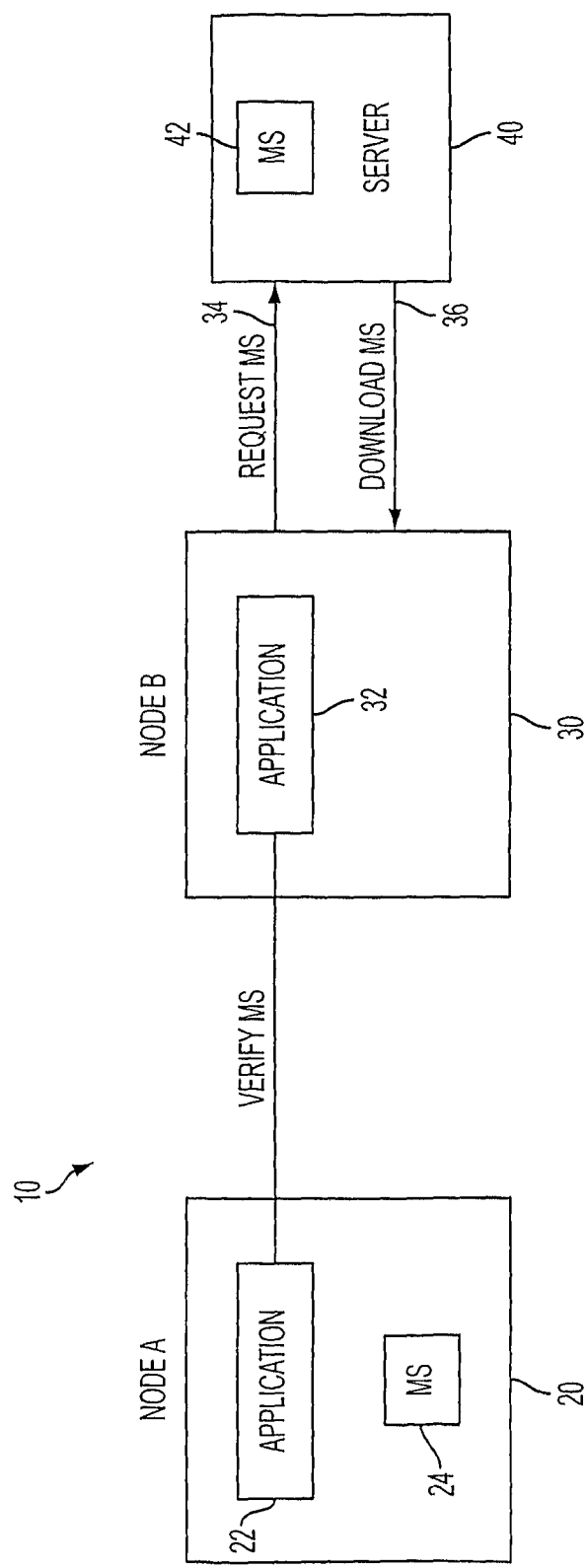
FIG. 1 is a schematic diagram of a system that includes two nodes and a server that provide necessary software to the nodes.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of two hosts and a measurement process that involves both hosts for determining various characteristics of the hosts and/or the network connecting the hosts. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to exemplary embodiments to be discussed later, a solution for addressing the concerns discussed above with regard to the limitations of the existing systems and methods is to use mobile code technology for providing the host(s) lacking the necessary measurement infrastructure, for example, by pushing or moving a measurement mobile code to the host lacking the necessary software. In the following, the term host is used to include a computer, server, mobile phone, personal digital assistant, camera, and/or a node in a network.

As discussed above, two hosts A and B may need to have a same specialized software package for performing a specialized activity. For example, the specialized software package may perform measurements along a network connecting the hosts while the specialized activity may be measuring an available bandwidth between the hosts. Other examples of the specialized software package and the specialized activity are discussed later. Considering that one of the hosts does not have the specialized software package or that the hosts have different versions of the specialized software package, a mobile code may be used for ensuring that both hosts have the specialized software package and/or matching versions of the specialized software package.

A mobile code is software that may be obtained, for example, from remote systems (computer, server, mobile phone, etc.), transferred across a network, and then downloaded and executed on a local system (host) without explicit installation or execution by the recipient. Examples of mobile code include scripts (JavaScript, VBScript), Java applets, ActiveX controls, Flash animations, Shockwave movies (and Xtras), and macros embedded within Office documents.

The mobile code can also be downloaded and executed in the client workstation via email. The mobile code may be download via an email attachment (e.g., macro in a Word file) or via an HTML email body (e.g., JavaScript). In most of the situations, the host is not aware that the mobile code is downloading and executing in their workstation. The mobile code is a generic name that may include, for example, a code, a mobile object, or a mobile agent. These categories are discussed next with regard to FIGS. 2-4.

Figure 2:
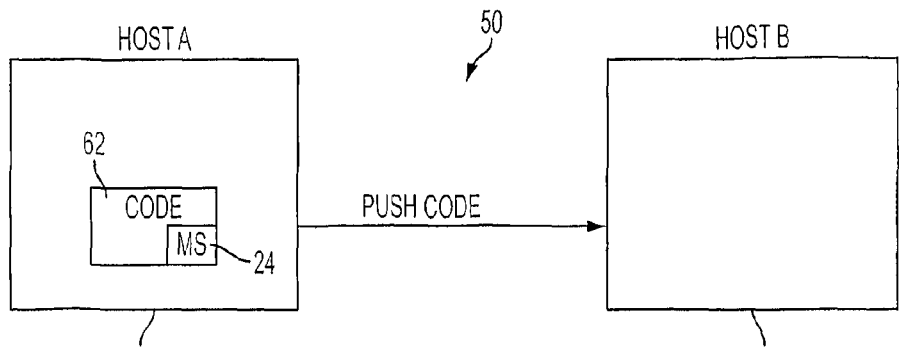
FIG. 2 is a schematic diagram of a system that includes two hosts with no server and one host includes a code.

An example of a system 50 that uses a code is illustrated in FIG. 2. The system 50 includes a host A 60 having the code 62 and a host B 70 which does not include measurement software. As discussed above, the measurement software is one of many examples of software that might be distributed by the code 62 and the measurement software is used here not to limit the exemplary embodiments. The code 62 may include computer instructions for performing measurements required by hosts A and B, i.e., the MS 24. Host A 60, based on a certain determination to be discussed later, may push the code 62 to be executed on host B. This method of operation is called remote evaluation. This method may be performed supposing that the execution environment on hosts A and B is the same and in one application the execution environment could be, for example, a Java Virtual Machine (JVM). Any execution environment may be used but, according to an exemplary embodiment, the same execution environment must be present on both hosts A and B.

Figure 3:
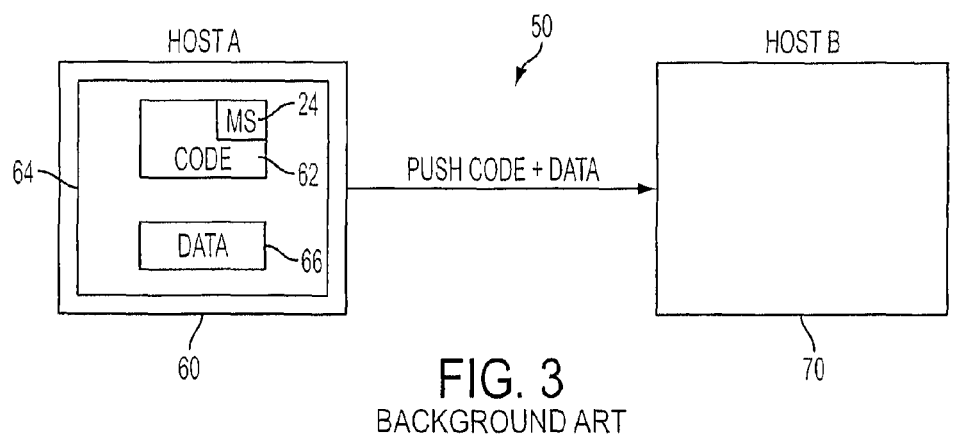
FIG. 3 is a schematic diagram of a system that includes two hosts with no server and one host includes a mobile object.

A more advanced form of mobile code is a mobile object, which also has the capability of being moved from host A to host B. In contrast to code 62, the mobile object contains both code (computer instructions) and data and the mobile object also moves the actual state of a running instance of the code. The data, according to an exemplary embodiment, includes values of variables used by the code. FIG. 3 shows the system 50 having the host A 60 and host B 70. Host A 60 may include the mobile object 64, which includes the specialized software package MS 24 and code 62 while host B 70 lacks the specialized software package. Upon a certain determination performed by host A 60 (or its mobile object 64), the mobile object 64 is pushed or moved to host B 70 for further execution. The mobile object 64 may include data 66 besides the code 62.

A third form of the mobile code is the mobile agent, which is more advanced than the mobile code 64 and can be understood as a type of software that implements one or all of four features: autonomy, social ability, learning, and mobility (see http://agent.cs.dartmouth.edu/MA2002Keynote.ppt, September 2008, the entire content of which is incorporated here by reference).

A mobile agent is understood by those skilled in the art as referring to a process that can transport its state from one environment to another, with its data intact, and still being able to perform appropriately in the new environment. Mobile agents decide when and where to move next, which is evolved from Remote Procedure Call (RPC). RPC is an Inter-process communication technology that allows a computer program to cause a subroutine or procedure to execute in another address space (commonly on another computer on a shared network) without the programmer explicitly coding the details for this remote interaction.

Thus, according to an exemplary embodiment, the mobile agent does not have to interact with the user of the host A for performing various functions, i.e., determining when to push or move the mobile agent to another host. Therefore, the mobile agent moves in a way similar to a user who does not really visit a website but only makes a copy of it, i.e., the mobile agent accomplishes the move through data duplication. When a mobile agent decides to move, it saves its own state and transports this saved state to next host and resume execution from the saved state.

Figure 4:
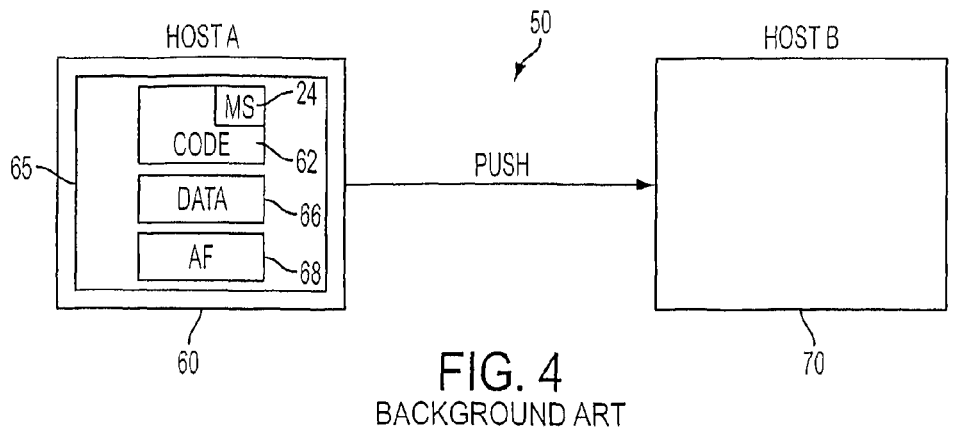
FIG. 4 is a schematic diagram of a system that includes two hosts with no server and one host includes a mobile agent.

In this regard, FIG. 4 shows the system 50 including host A 60 and host B 70. The structure of hosts A and B shown in FIG. 4 are similar to those shown in FIG. 3 except that host A 60 has the mobile agent 65 that includes not only the code 62 and the data 64 but also advanced features 68. The advanced features may be, for example, the autonomy, social ability, learning, and mobility.

As discussed above, mobile agents are a specific form of the mobile code. However, in contrast to, for example, the remote evaluation and mobile object paradigms, mobile agents are active in that they may choose to migrate between computers at any time during their execution. This is a valuable tool for implementing distributed applications in a computer network.

The various forms of the mobile code discussed above may be configured to support active end-to-end measurements between hosts A and B. To perform active end-to-end measurements, the conventional method is to provide each host with the measurement code (e.g., BART, PathChirp). However, according to the exemplary embodiments, a method of performing active end-to-end measurements between two hosts is described even if one host initially lacks the required measurement application/code.

Figure 5:
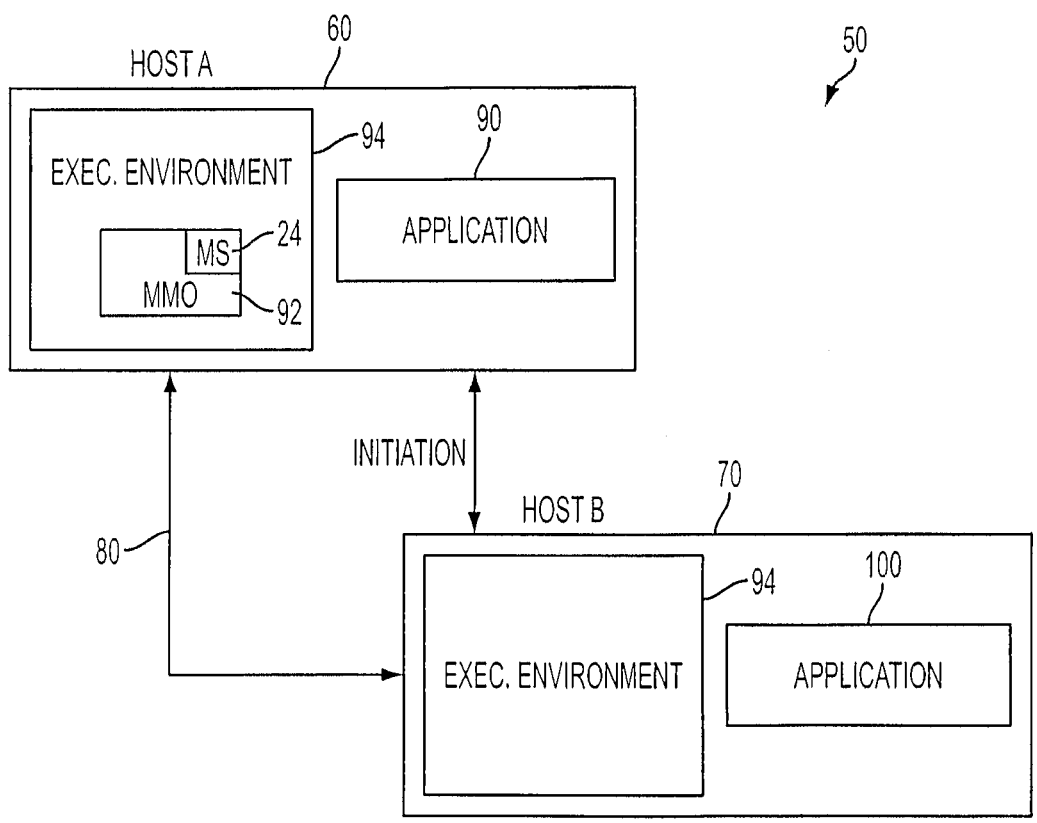
FIG. 5 is a schematic diagram of a system that includes two hosts, one including a mobile object and one lacking the mobile object and the host having the mobile object initiating communication with the other host according to an exemplary embodiment.

To exemplify this method in more details, FIG. 5 shows a system 50 that includes host A 60 and host B 70. The two hosts A and B may be linked via a network 80. Assume that host A 60 includes an application 90 that would like to communicate with host B 70 (could be the actual host B 70 or an application 100 running on top of host B 70). The communication may take place over a packet-switched network 80 (e.g., in the IP-based Internet). It is also assumed that the hosts/applications need information about the network status and performance of the network path connecting the hosts/applications in order to optimize, e.g., a communication performance. Further, it is assumed that host A 60 includes a mobile measurement object (MMO) 92, which may be the code, the mobile object or the mobile agent, and a mobile measurement object execution environment 94, in which the MMO 92 is executed. The MMO 92 may be substituted with the code 62 and/or the mobile agent 65 discussed previously with regard to FIGS. 2 and 4. The MMO 92 may perform the measurements of the measurement software MS 24 and for this reason FIG. 5 and some of the next figures show the MMO 92 including MS 24. Thus, this illustration of the MS 24 as being part of the MMO 92 should be understood as either the MMO 92 including the MS 24 and/or the MMO 92 having the capabilities of the MS 24.

Figure 8:
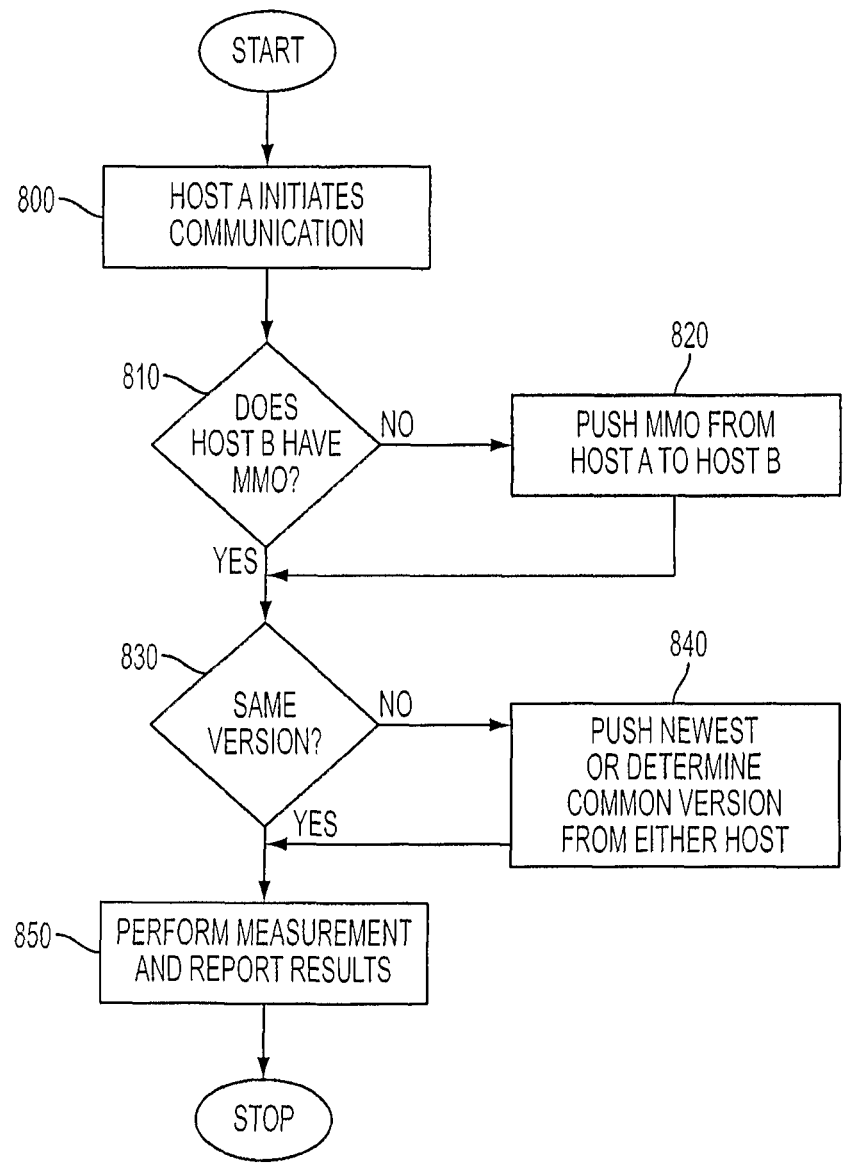
FIG. 8 is a flow chart illustrating steps for pushing the mobile object from one host to another host according to an exemplary embodiment.

Steps of the method for performing active end-to-end measurements between the two hosts A and B are discussed with regard to FIG. 8. The method starts with step 800, in which host A 60 initiates communication with host B 70. During this step, host A 60 may probe (send a message) host B 70 to verify whether host B 70 includes the necessary measurement software MS 24. The initiating host, in this case host A 60, possesses the MMO 92 that is capable of performing the necessary measurement tasks (see FIG. 5) while host B 70 does not posses the measurement software. According to an exemplary embodiment, the method described here works more efficient when hosts A and B have the same mobile measurement object execution environment (MMO Exec environment) 94.

Figure 6:
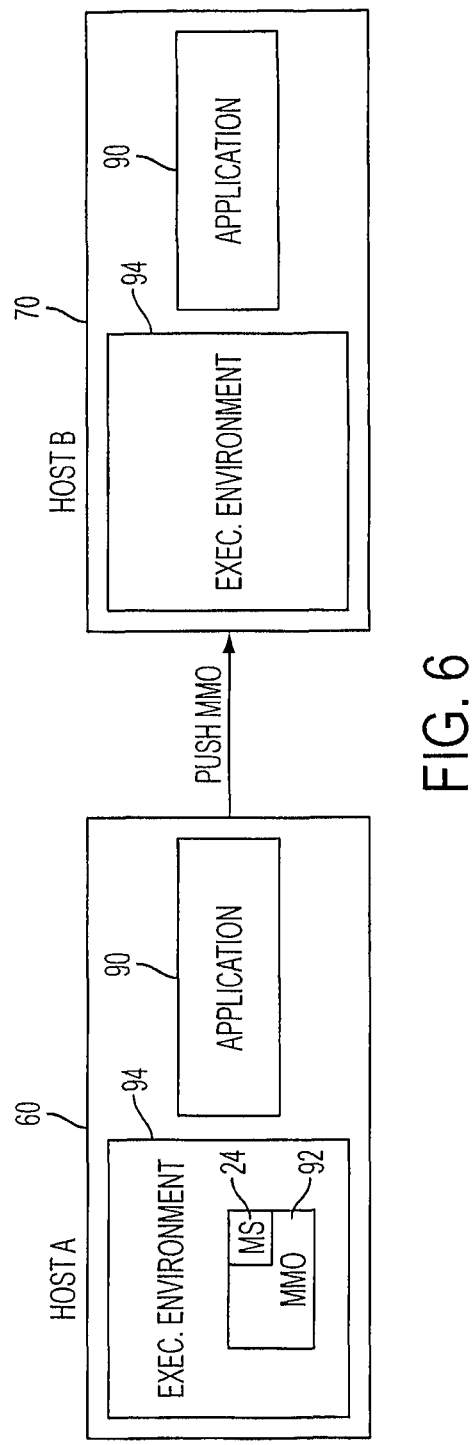
FIG. 6 is a schematic diagram of the system of FIG. 5 in which the host with the mobile object is pushing the mobile object to the other host according to another exemplary embodiment.

If in step 810 it is determined that host B 70 does not have the measurement software, the MMO 92 is pushed (see FIG. 6) from host A 60 to host B 70 in step 820. Thus, after this step both hosts A and B have the MMO 92 capable of performing the desired measurement. Optionally, in step 830, host A 60 may verify whether both hosts A and B have the same version of the MS 24 of the MMO 92, when in step 810 is determined that host B has the MMO 92. If it is determined in step 830 that hosts A and B do not have the same version, the method advances to step 840. In this step the host that has the most recent version pushes that version of the MMO 92 to the other host. Alternatively, if hosts A and B have each multiple versions of the MMO 92, a common version of the MMO 92 may be identified and used for future communications.

The MMO 92 may be a mobile object that has the purpose of measuring metrics such as RTT, end-to-end available bandwidth, jitter, one-way delay, delay variation, or simply availability. The MMO 92 may be stored in such a way that it can be moved as well as executed in the MMO Exec environment (e.g. Java serialization).

Figure 7:
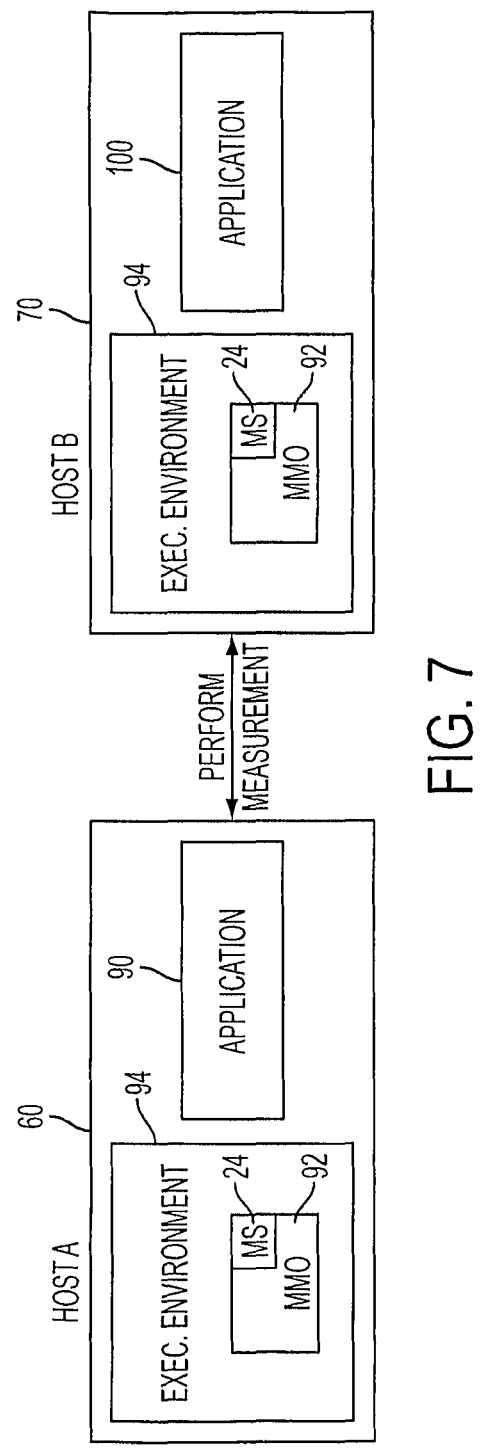
FIG. 7 is a schematic diagram of the system of FIG. 5 in which the two hosts are performing measurements using the mobile objects according to an exemplary embodiment.

After both hosts A and B have the same MMO 92, the process advances to step 850, in which measurements are performed between host A 60 and host B 70 (see FIG. 7). After measurements are performed between the MMO 92 located at hosts A and B, results of the measurements are forward to one or both applications 100 such that a communication between the two applications 100 is enabled. After the measurement data has been used by the applications 100, the MMO 92 pushed at host B 70 may either be cached at the host B or simply removed.

As discussed with regard to FIG. 8, the mobile code (MMO 92) may be employed not only to provide a host lacking a specialized software package (MS 24) with that package but also to update an existing specialized software package. For example, as the measurement techniques are frequently improved, the measurement software at end points needs to be updated for the correct measurement to take place. According to an exemplary embodiment, by using the push property of the mobile code, this updating operation may be performed with minimal interruption of the user of the host. When two hosts, both possessing an execution environment, have different versions of the measurement software, the host with the latest version may be configured to push the measurement software to the other host.

Figure 9:
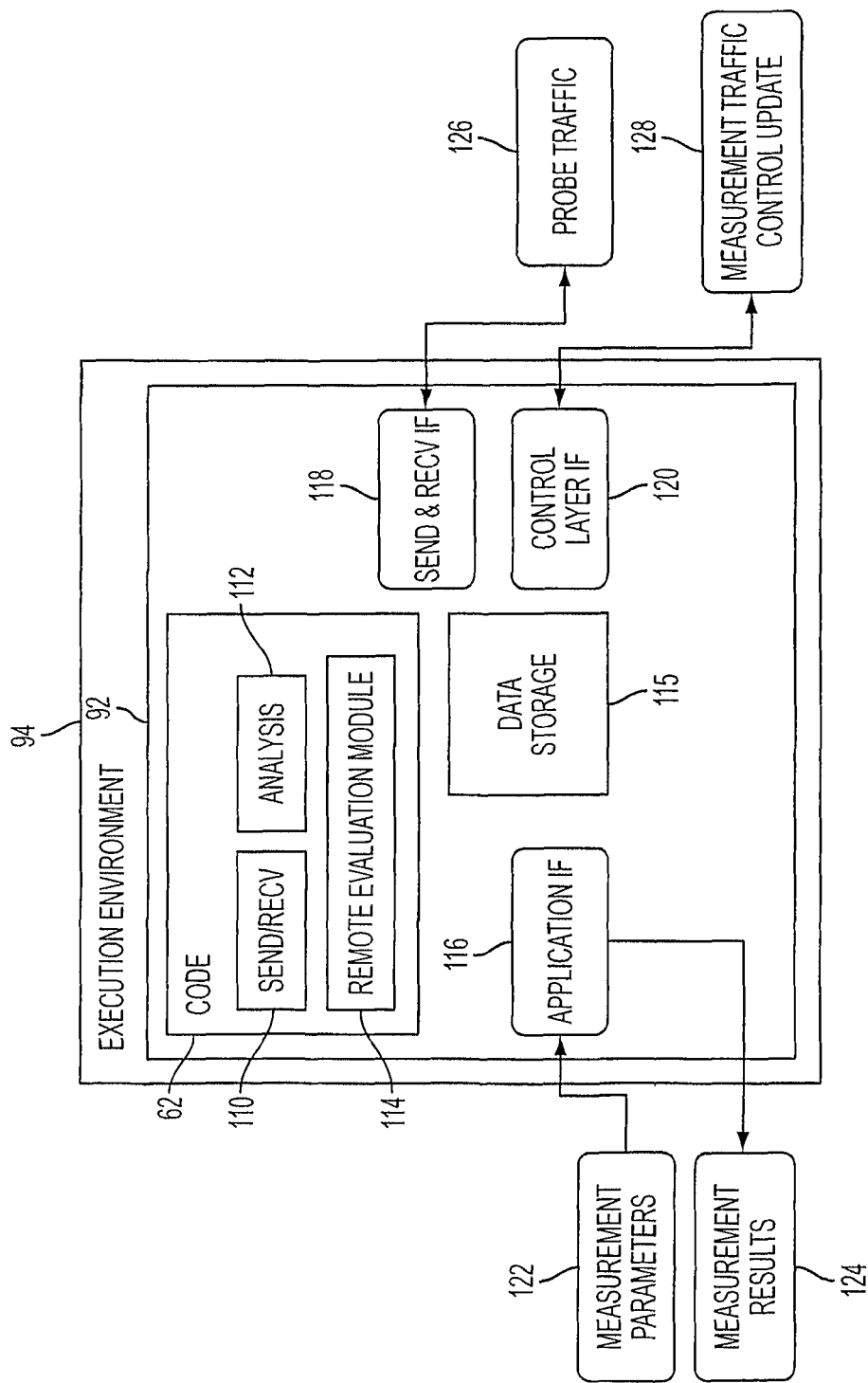
FIG. 9 illustrates a structure of the mobile code according to an exemplary embodiment.

According to an exemplary embodiment, a structure of the MMO 92 or agent 65 is shown in FIG. 9. An instance of such an object can, for example, be executed in a common virtual machine that is shared among the hosts. The MMO 92 may include the code part 62. The code part 62 may include a unit 110 for sending and receiving measurement packets, an analysis unit 112 for deducing/estimating a path status (e.g., available bandwidth, jitter, etc.) and a remote evaluation module 114 for implementing the mobile code logic in the MMO. This module may be responsible for all aspects related to performing code migration (push), initiating the mobile code on the new host and supporting one or more aspects of the MMO execution. The MMO 92 may also include a storage module 115 for storing measurement results or other data and various interfaces 116, 118 and 120. The application interface 116 may receive measurements parameters 122 (such as addresses) from the application 100 and/or measurement software MS 24 and provide measurement results 124 to application 100. The send and receive interface 118 may interface with the network for probing the traffic 126 between the hosts A and B. In other words, the send and receive interface 118 is configured to access the network stack in order to send and receive packets according to the measurement algorithm implemented by the MMO 92. The control layer 120 may interact with the measurement traffic control update 128 to synchronize activities and data between distributed MMOs that are assigned to solve together a task (two or more communicating hosts).

Figure 10:
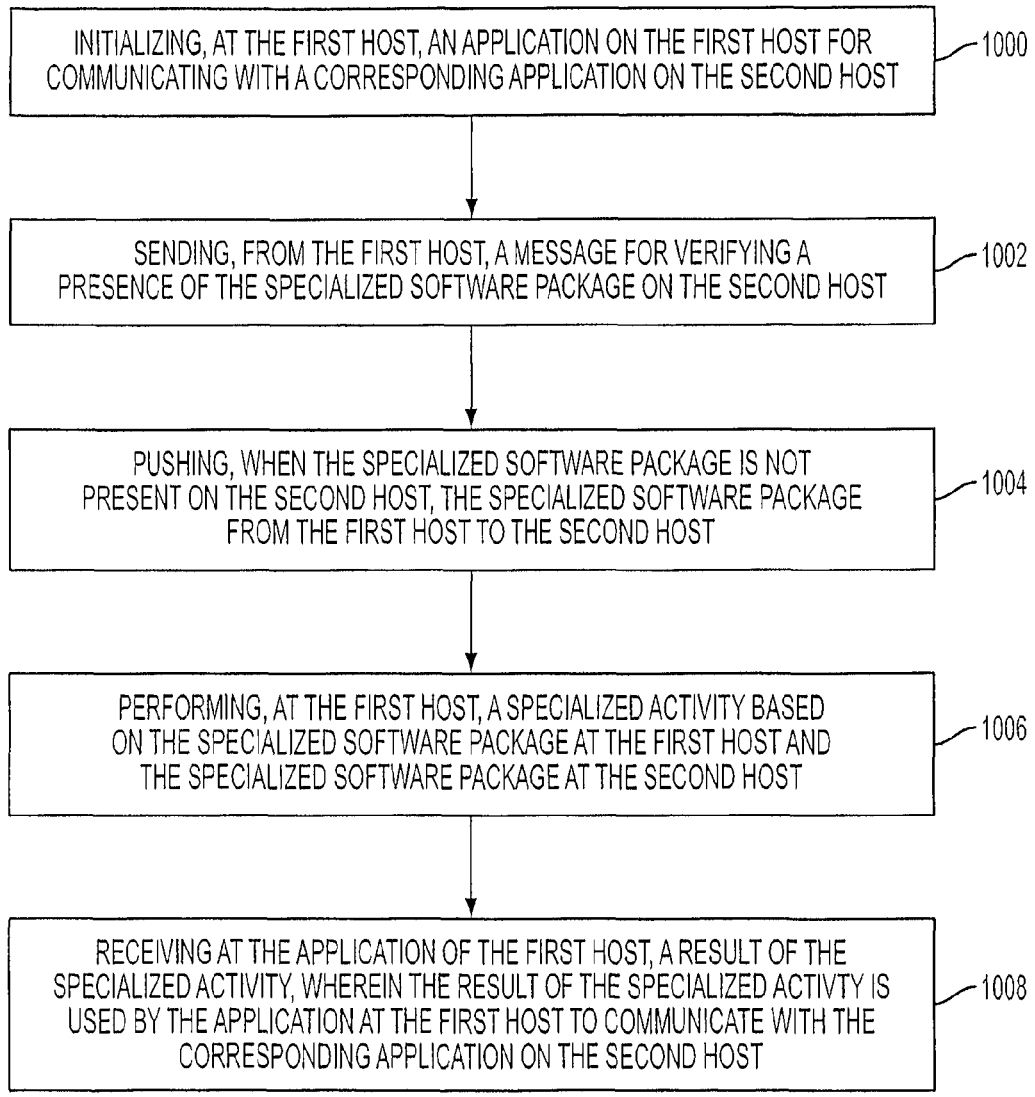
FIG. 10 is a flow chart illustrating steps for pushing a specialized software package from one host to another host according to an exemplary embodiment.

According to an exemplary embodiment shown in FIG. 10, there is a method for providing a specialized software package from a first host to a second host. The method includes a step 1000 of initializing, at the first host, an application on the first host for communicating with a corresponding application on the second host, a step 1002 of sending, from the first host, a message for verifying a presence of the specialized software package on the second host, a step 1004 of pushing, when the specialized software package is not present on the second host, the specialized software package from the first host to the second host, a step 1006 of performing, at the first host, a specialized activity based on the specialized software package at the first host and the specialized software package at the second host, and a step 1008 of receiving at the application of the first host, a result of the specialized activity, where the result of the specialized activity is used by the application at the first host to communicate with the corresponding application on the second host.

Figure 11:
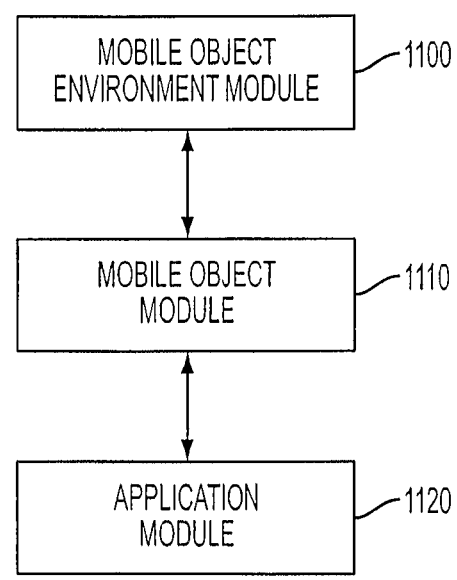
FIG. 11 illustrates a system including distinct software modules.

According to an exemplary embodiment shown in FIG. 11, the steps of the above method may be implemented as computer executable instructions on a computer readable medium, wherein the instructions, when executed, implement the method of FIG. 11. The method includes providing a system including distinct software modules, where the distinct software modules comprise a mobile object environment module 1100, a mobile object module 1110, and an application module 1120. These modules interact among each other similar to elements 94, 93, and 100 discussed above.

As already discussed, the specialized software package is configured to perform at least one active end-to-end measurement between the first host and the second host along a network connecting the first and second hosts, and the specialized activity is one of measuring a round-trip time, jitter, availability, one-way delay, delay variation and available bandwidth between the first and second hosts. The application may be one of a video communication over IP packets, voice over IP, gaming, or interactive application between the first and second hosts and the method may also include, a step of verifying, when the specialized software package is present on the second host, a version of the specialized software package on the second host, and a step of pushing a newest version of the specialized software package to that host that has an older version of the specialized software package or using a common version of the specialized software package when the first and second hosts have multiple versions of the specialized software package.

The pushing step may include storing the specialized software package into a mobile object that is configured to replicate from the first host to the second host and the mobile object includes computer instructions and data related to variables of the computer instructions. Although the exemplary embodiments have been discussed with regard to the MMO 92, a code 62 or mobile agent 65 may be used instead of the MMO 92.

Contrary to the state-of-the-art end-to-end measurement methods that require a sender and a receiver to possess beforehand a piece of software, some of the exemplary embodiments discussed above make it possible to perform such network measurements even if the hosts are not enabled with the necessary measurement software.

Further, problems with network measurement application versions are solved using some of the exemplary embodiments. Since the host requesting a measurement can push the network measurement software to the other host, the hosts may always run the same version such that the success rate for the measurement increases.

Figure 12:
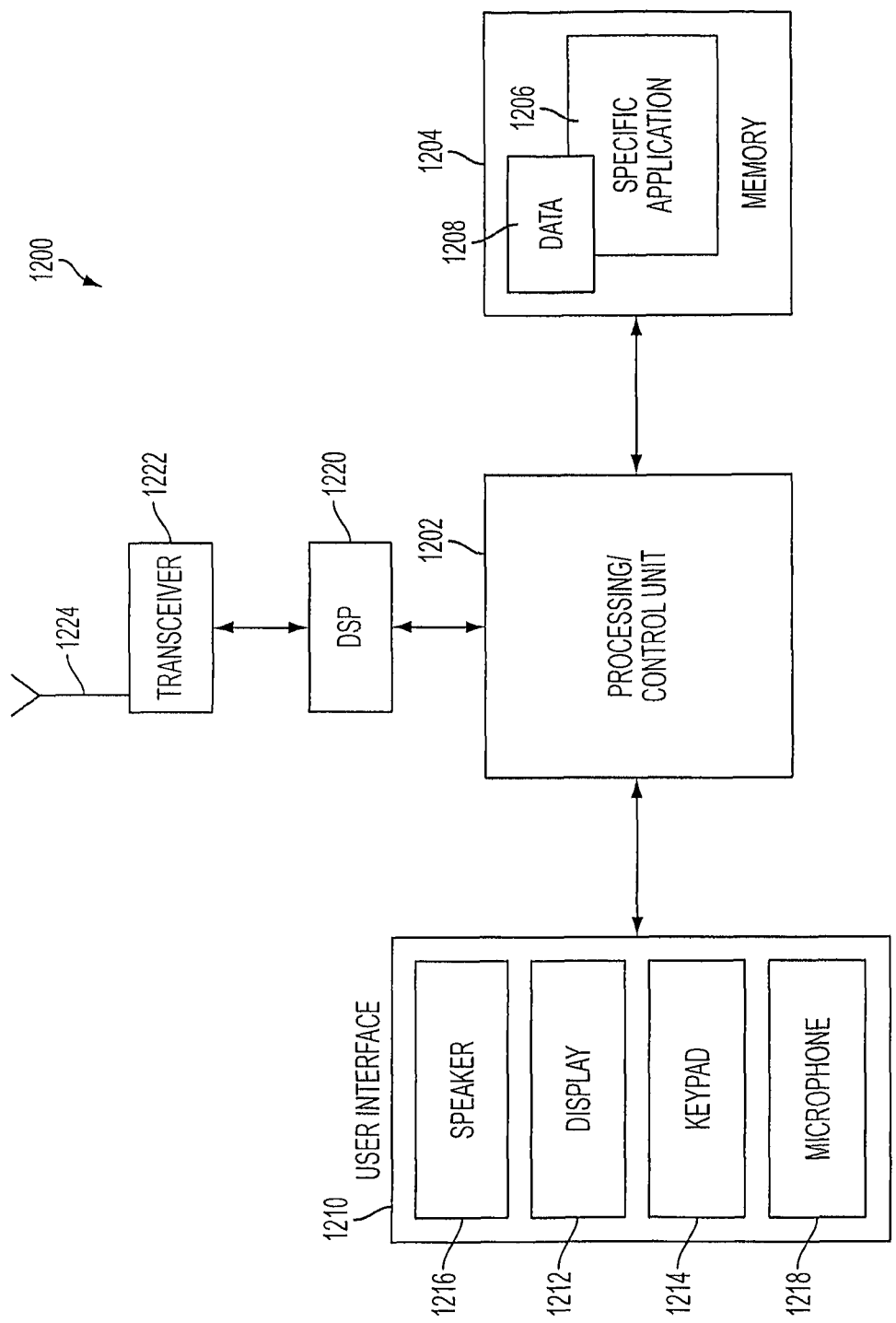
FIG. 12 is a schematic diagram of one of the hosts.

For purposes of illustration and not of limitation, an example of a representative host capable of carrying out operations in accordance with the exemplary embodiments is illustrated in FIG. 12. It should be recognized, however, that the principles of the present exemplary embodiments are equally applicable to standard computing systems.

The exemplary host 1200 may include a processing/control unit 1202, such as a microprocessor, reduced instruction set computer (RISC), or other central processing module. The processing unit 1202 need not be a single device, and may include one or more processors. For example, the processing unit 1202 may include a master processor and associated slave processors coupled to communicate with the master processor.

The processing unit 1202 may control the basic functions of the system as dictated by programs available in the storage/memory 1204. Thus, the processing unit 1202 may execute the functions described in FIGS. 5-10. More particularly, the storage/memory 1204 may include an operating system and program modules for carrying out functions and applications on the host. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the host 1200 via data signals, such as being downloaded electronically via a network, such as the Internet.

One of the programs that may be stored in the storage/memory 1204 is a specific program 1206. As previously described, the specific program 1206 may be the measurement software. The program 1206 and associated features may be implemented in software and/or firmware operable by way of the processor 1202. The program storage/memory 1204 may also be used to store data 1208 associated with the present exemplary embodiments. In one exemplary embodiment, the programs 1206 and data 1208 are stored in non-volatile electrically-erasable, programmable ROM (EEPROM), flash ROM, etc. so that the information is not lost upon power down of the host 1200.

The processor 1202 may also be coupled to user interface 1210 elements. The user interface 1210 of the host may include, for example, a display 1212 such as a liquid crystal display, a keypad 1214, speaker 1216, and a microphone 1218. These and other user interface components are coupled to the processor 1202 as is known in the art. The keypad 1214 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The host 1200 may also include a digital signal processor (DSP) 1220. The DSP 1220 may perform a variety of functions, including analog-to-digital (A/D) conversion, digital-to-analog (D/A) conversion, speech coding/decoding, encryption/decryption, error detection and correction, bit stream translation, filtering, etc. The transceiver 1222, generally coupled to an antenna 1224, may transmit and receive the radio signals associated with a wireless device.

The host 1200 of FIG. 12 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 1206 and associated features, and data 1208, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a host, a method and a computer program product for providing a specialized software package from a first host to a second host. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for providing a specialized software package from a first host to a second host, the method comprising:
    initializing, at the first host, an application on the first host for communicating with a corresponding application on the second host;
    sending, from the first host, a message for verifying a presence of the specialized software package on the second host, wherein the specialized software package is configured to perform at least one active end-to-end measurement between the first host and the second host along a network connecting the first and second hosts;
    pushing, when the specialized software package is not present on the second host, the specialized software package from the first host to the second host;
    performing, at the first host, a specialized activity based on the specialized software package at the first host and the specialized software package at the second host, wherein the specialized activity is one of measuring a round-trip time, jitter, availability, one-way delay, delay variation and available bandwidth between the first and second hosts; and
    receiving at the application of the first host, a result of the specialized activity, wherein the result of the specialized activity is used by the application at the first host to communicate with the corresponding application on the second host.

2. The method of claim 1, wherein the application is one of a video communication over internet protocol packets, voice over internet protocol, gaming, or interactive application between the first and second hosts.

3. The method of claim 1, further comprising:
    verifying, when the specialized software package is present on the second host, a version of the specialized software package on the second host; and
    pushing a newest version of the specialized software package to that host that has an older version of the specialized software package or using a common version of the specialized software package when the first and second hosts have multiple versions of the specialized software package.

4. The method of claim 1, wherein the pushing step comprises:
    storing the specialized software package into a mobile object that is configured to replicate from the first host to the second host.

5. The method of claim 4, wherein the mobile object includes computer instructions and data related to variables of the computer instructions and the mobile object replicates without interacting with a user of the first host.

6. A non-transitory computer readable medium including computer executable instructions, wherein the instructions, when executed, implement a method for providing a specialized software package from a first host to a second host, the method comprising:
    providing a system comprising distinct software modules, wherein the distinct software modules comprise a mobile object environment module, a mobile object module, and an application module;
    initializing, at the first host, the application module on the first host for communicating with a corresponding application module on the second host;
    sending, from the first host, a message for verifying a presence of the specialized software package on the second host, wherein the specialized software package is configured to run in the mobile object environment module and to perform at least one active end-to-end measurement between the first host and the second host along a network connecting the first and second hosts;
    pushing, when the specialized software package is not present on the second host, the specialized software package from the first host to the second host;
    performing, at the first host, a specialized activity based on the specialized software package at the first host and the specialized software package at the second host, wherein the specialized activity is one of measuring a round-trip time, jitter, availability, one-way delay, delay variation and available bandwidth between the first and second hosts; and
    receiving at the application module of the first host, a result of the specialized activity, wherein the result of the specialized activity is used by the application module at the first host to communicate with the corresponding application module on the second host.

7. The medium of claim 6, wherein the application module includes one of a video communication over internet protocol packets, voice over internet protocol, gaming, or interactive application between the first and second hosts.

8. The medium of claim 6, further comprising:
    verifying, when the specialized software package is present on the second host, a version of the specialized software package on the second host; and
    pushing a newest version of the specialized software package to that host that has an older version of the specialized software package or using a common version of the specialized software package when the first and second hosts have multiple versions of the specialized software package.

9. The medium of claim 6, wherein the pushing step comprises:
    storing the specialized software package into the mobile object module, which is configured to replicate from the first host to the second host.

10. The medium of claim 9, wherein the mobile object module includes computer instructions and data related to variables of the computer instructions and the mobile object module replicates without interacting with a user of the first host.

11. A communication device for providing a specialized software package to another communication device, the communication device comprising:
    a memory for storing an application that is configured to communicate with a corresponding application on the another communication device; and
    a processor configured to:
    send a message for verifying a presence of the specialized software package on the another communication device, wherein the specialized software package is configured to perform at least one active end-to-end measurement between the first host and the second host along a network connecting the first and second hosts, push, when the specialized software package is not present on the another communication device, the specialized software package from the communication device to the another communication device, perform a specialized activity based on the specialized software package at the communication device and the specialized software package at the another communication device, wherein the specialized activity is one of measuring a round-trip time, jitter, availability, one-way delay, delay variation and available bandwidth between the first and second hosts, and receive a result of the specialized activity, wherein the result of the specialized activity is used by the application at the communication device to communicate with the corresponding application at the another communication device.

12. The device of claim 11, wherein the application is one of a video communication over internet protocol packets, voice over internet protocol, gaming, or interactive application between the communication device and the another communication device.

13. The device of claim 11, wherein the processor is further configured to:

verify, when the specialized software package is present on the another communication device, a version of the specialized software package on the another communication device; and push a newest version of the specialized software package to that communication device that has an older version of the specialized software package or using a common version of the specialized software package when the communication device and the another communication device have multiple versions of the specialized software package.

14. The device of claim 11, wherein the specialized software package is part of a mobile object stored in the memory and configured to replicate from the communication device to the another communication device without interacting with a user of the communication device.

15. The device of claim 14, wherein the mobile object includes computer instructions and data related to variables of the computer instructions.

16. The device of claim 11, wherein the device is one of a computer, portable computer, personal digital assistant, game console, and mobile phone.

\* \* \* \* \*